U S011168571B2

United States Patent
Niezelski et al.

(10) Patent No.: US 11,168,571 B2
(45) Date of Patent: Nov. 9, 2021

(54) AIRFOIL HAVING DEAD-END TIP FLAG CAVITY

(71) Applicant: United Technologies Corporation, Farmington, CT (US)

(72) Inventors: David A. Niezelski, Manchester, CT (US); Timothy J. Jennings, West Hartford, CT (US); Bret M. Teller, Meriden, CT (US); John McBrien, Nashua, NH (US); Thomas N. Slavens, Norman, OK (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 15 days.

(21) Appl. No.: 16/745,930

(22) Filed: Jan. 17, 2020

(65) Prior Publication Data

US 2020/0256196 A1 Aug. 13, 2020

Related U.S. Application Data

(60) Provisional application No. 62/802,912, filed on Feb. 8, 2019.

(51) Int. Cl.
*F01D 5/18* (2006.01)
*F01D 25/12* (2006.01)

(52) U.S. Cl.
CPC ............. *F01D 5/187* (2013.01); *F01D 5/186* (2013.01); *F01D 25/12* (2013.01);
(Continued)

(58) Field of Classification Search
CPC . F01D 5/187; F01D 5/20; F01D 5/186; F05D 2240/307
See application file for complete search history.

(56) References Cited

U.S. PATENT DOCUMENTS 7,967,563 B1 * 6/2011 Liang ..................... F01D 5/186
416/1
9,745,853 B2 8/2017 Lee et al.
(Continued)

FOREIGN PATENT DOCUMENTS

EP  2942487 A1  11/2015
EP  3020923 A1  5/2016

OTHER PUBLICATIONS

European Search Report for European Application No. 20156368.1, International Filing Date Feb. 10, 2020, dated Jun. 22, 2020, 9 pages.

*Primary Examiner* — Eldon T Brockman
(74) *Attorney, Agent, or Firm* — Cantor Colburn LLP

(57) ABSTRACT

Airfoils for gas turbine engines are described. The airfoils include an airfoil body extending between a platform and a tip, the airfoil body having a leading edge, a trailing edge, a pressure side, and a suction side, a serpentine cavity formed within the airfoil body and having an up-pass serpentine cavity, a down-pass serpentine cavity, and a trailing edge cavity, and a dead-end tip flag cavity extending in a direction between the leading edge and the trailing edge, the dead-end tip flag cavity arrange between the serpentine cavity and the tip, wherein the dead-end tip flag cavity ends at a dead-end wall located at a position between the leading edge and the trailing edge of the airfoil body.

14 Claims, 5 Drawing Sheets

(52) U.S. Cl.
CPC .. *F05D 2260/201* (2013.01); *F05D 2260/202* (2013.01); *F05D 2260/22141* (2013.01)

(56) References Cited

U.S. PATENT DOCUMENTS

2005/0265839 A1* 12/2005 Mongillo, Jr. ............ F01D 5/20
    416/97 R
2016/0194965 A1* 7/2016 Spangler ................ F01D 5/186
    415/115

* cited by examiner

AIRFOIL HAVING DEAD-END TIP FLAG CAVITY

CROSS-REFERENCE TO RELATED APPLICATIONS

This application claims the benefit of U.S. Provisional Application Ser. No. 62/802,912 filed Feb. 8, 2019, the disclosure of which is incorporated herein by reference in its entirety.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external sidewalls and/or internal to the airfoil. Such cooling cavities are subject to both hot material walls (exterior or external) and cold material walls (interior or internal). Further, different cooling schemes may be necessary for blades and vanes due to operational parameters, environment, and/or conditions. Although such cavities are designed for cooling portions of airfoil bodies, improved cooling designs may be desirable.

BRIEF DESCRIPTION

According to some embodiments, airfoils for gas turbine engines are provided. The airfoils include an airfoil body extending between a platform and a tip, the airfoil body having a leading edge, a trailing edge, a pressure side, and a suction side, a serpentine cavity formed within the airfoil body and having an up-pass serpentine cavity, a down-pass serpentine cavity, and a trailing edge cavity, and a dead-end tip flag cavity extending in a direction between the leading edge and the trailing edge, the dead-end tip flag cavity arrange between the serpentine cavity and the tip, wherein the dead-end tip flag cavity ends at a dead-end wall located at a position between the leading edge and the trailing edge of the airfoil body.

In addition to one or more of the features described above, or as an alternative, further embodiments of the airfoils may include that the dead-end tip flag cavity is defined by an outer wall, an inner wall, and the dead-end wall, with the outer wall and the inner wall extending in a direction between the leading edge and the trailing edge and the dead-end wall extending in a direction between the platform and the tip.

In addition to one or more of the features described above, or as an alternative, further embodiments of the airfoils may include at least one bleed hole arranged to fluidly connect the dead-end tip flag cavity and the serpentine cavity, the at least one bleed hole formed in the inner wall of the dead-end tip flag cavity.

In addition to one or more of the features described above, or as an alternative, further embodiments of the airfoils may include a squealer pocket arranged at the tip of the airfoil body, wherein the outer wall of the dead-end tip flag cavity forms a pocket surface of the squealer pocket.

In addition to one or more of the features described above, or as an alternative, further embodiments of the airfoils may include at least one tip cooling hole formed within the outer wall and configured to enable fluid connection between the dead-end tip flag cavity and the squealer pocket.

In addition to one or more of the features described above, or as an alternative, further embodiments of the airfoils may include that the dead-end tip flag cavity and the down-pass serpentine cavity of the serpentine cavity end at the same axial position in a direction between the leading edge and the trailing edge of the airfoil body.

In addition to one or more of the features described above, or as an alternative, further embodiments of the airfoils may include a leading edge cavity extending in a direction from the platform to the tip and arranged along the leading edge of the airfoil body.

In addition to one or more of the features described above, or as an alternative, further embodiments of the airfoils may include that the leading edge cavity and the dead-end tip flag cavity are fluidly connected.

In addition to one or more of the features described above, or as an alternative, further embodiments of the airfoils may include the trailing edge cavity includes an outer most trailing edge slot proximate to the tip and having a radial height, wherein a radial height of the dead-end tip flag cavity is equal to the radial height of the outer most trailing edge slot.

In addition to one or more of the features described above, or as an alternative, further embodiments of the airfoils may include that the down-pass serpentine cavity of the serpentine cavity is defined in part by an aft down pass rib and wherein the dead-end wall of the dead-end cavity are aligned in a direction from the platform to the tip.

According to some embodiments, gas turbine engines are provided. The gas turbine engines include a turbine section having a plurality of airfoils. At least one airfoil includes a blade having an airfoil body extending between a platform and a tip, the airfoil body having a leading edge, a trailing edge, a pressure side, and a suction side, a serpentine cavity formed within the airfoil body and having an up-pass serpentine cavity, a down-pass serpentine cavity, and a trailing edge cavity, and a dead-end tip flag cavity extending in a direction between the leading edge and the trailing edge, the dead-end tip flag cavity arrange between the serpentine cavity and the tip, wherein the dead-end tip flag cavity ends at a dead-end wall located at a position between the leading edge and the trailing edge of the airfoil body.

In addition to one or more of the features described above, or as an alternative, further embodiments of the gas turbine engines may include that the dead-end tip flag cavity is defined by an outer wall, an inner wall, and the dead-end wall, with the outer wall and the inner wall extending in a direction between the leading edge and the trailing edge and the dead-end wall extending in a direction between the platform and the tip.

In addition to one or more of the features described above, or as an alternative, further embodiments of the gas turbine engines may include at least one bleed hole arranged to fluidly connect the dead-end tip flag cavity and the serpentine cavity, the at least one bleed hole formed in the inner wall of the dead-end tip flag cavity.

In addition to one or more of the features described above, or as an alternative, further embodiments of the gas turbine engines may include a squealer pocket arranged at the tip of the airfoil body, wherein the outer wall of the dead-end tip flag cavity forms a pocket surface of the squealer pocket.

In addition to one or more of the features described above, or as an alternative, further embodiments of the gas turbine engines may include at least one tip cooling hole formed within the outer wall and configured to enable fluid connection between the dead-end tip flag cavity and the squealer pocket.

In addition to one or more of the features described above, or as an alternative, further embodiments of the gas turbine engines may include that the dead-end tip flag cavity and the down-pass serpentine cavity of the serpentine cavity end at the same axial position in a direction between the leading edge and the trailing edge of the airfoil body.

In addition to one or more of the features described above, or as an alternative, further embodiments of the gas turbine engines may include a leading edge cavity extending in a direction from the platform to the tip and arranged along the leading edge of the airfoil body.

In addition to one or more of the features described above, or as an alternative, further embodiments of the gas turbine engines may include that the leading edge cavity and the dead-end tip flag cavity are fluidly connected.

In addition to one or more of the features described above, or as an alternative, further embodiments of the gas turbine engines may include that the trailing edge cavity includes an outer most trailing edge slot proximate to the tip and having a radial height, wherein a radial height of the dead-end tip flag cavity is equal to the radial height of the outer most trailing edge slot.

In addition to one or more of the features described above, or as an alternative, further embodiments of the gas turbine engines may include that the down-pass serpentine cavity of the serpentine cavity is defined in part by an aft down pass rib and wherein the dead-end wall of the dead-end cavity are aligned in a direction from the platform to the tip.

According to some embodiments, core assemblies for the formation of airfoils for gas turbine engines are provided. The core assemblies include a serpentine cavity core configured to form a serpentine cavity in a formed airfoil, the serpentine cavity core having an up-pass serpentine cavity core, a down-pass serpentine cavity core, and a trailing edge cavity core and a dead-end tip flag cavity core positioned relative to the serpentine cavity core, the dead-end tip flag cavity core extending in a direction between a leading edge and a trailing edge of the formed airfoil, the dead-end tip flag cavity core arrange between the serpentine cavity core and a tip location of the formed airfoil, wherein the dead-end tip flag cavity core ends at a dead-end located at a position between the leading edge and the trailing edge of the formed airfoil. The dead-end tip flag cavity core is configured to form a dead-end tip flag cavity in the formed airfoil.

In addition to one or more of the features described above, or as an alternative, further embodiments of the core assemblies may include at least one stand-off connecting the dead-end tip flag cavity core to the serpentine cavity core, wherein the at least one stand-off forms bleed hole in the formed airfoil and arranged to fluidly connect the formed dead-end tip flag cavity and the formed serpentine cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
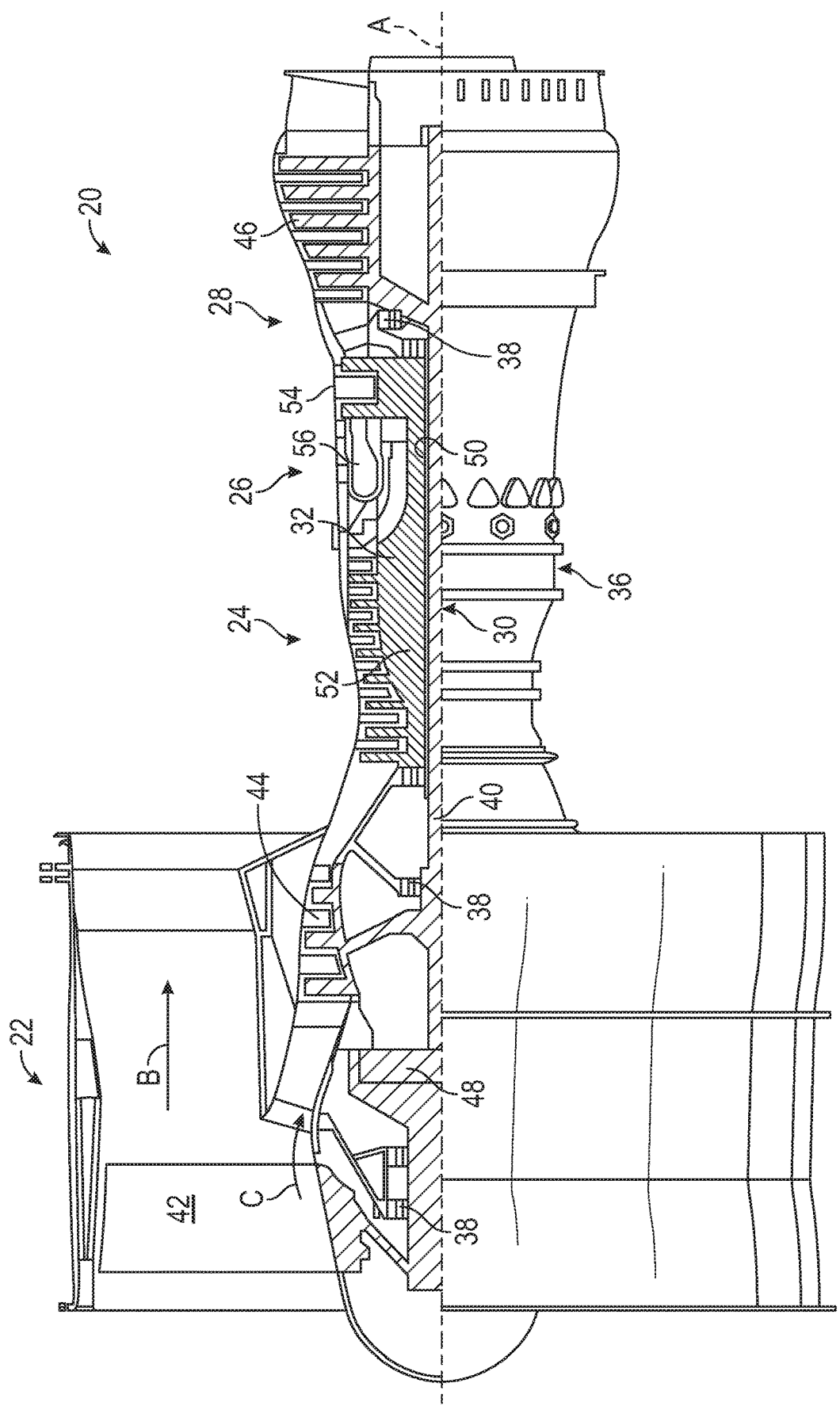
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
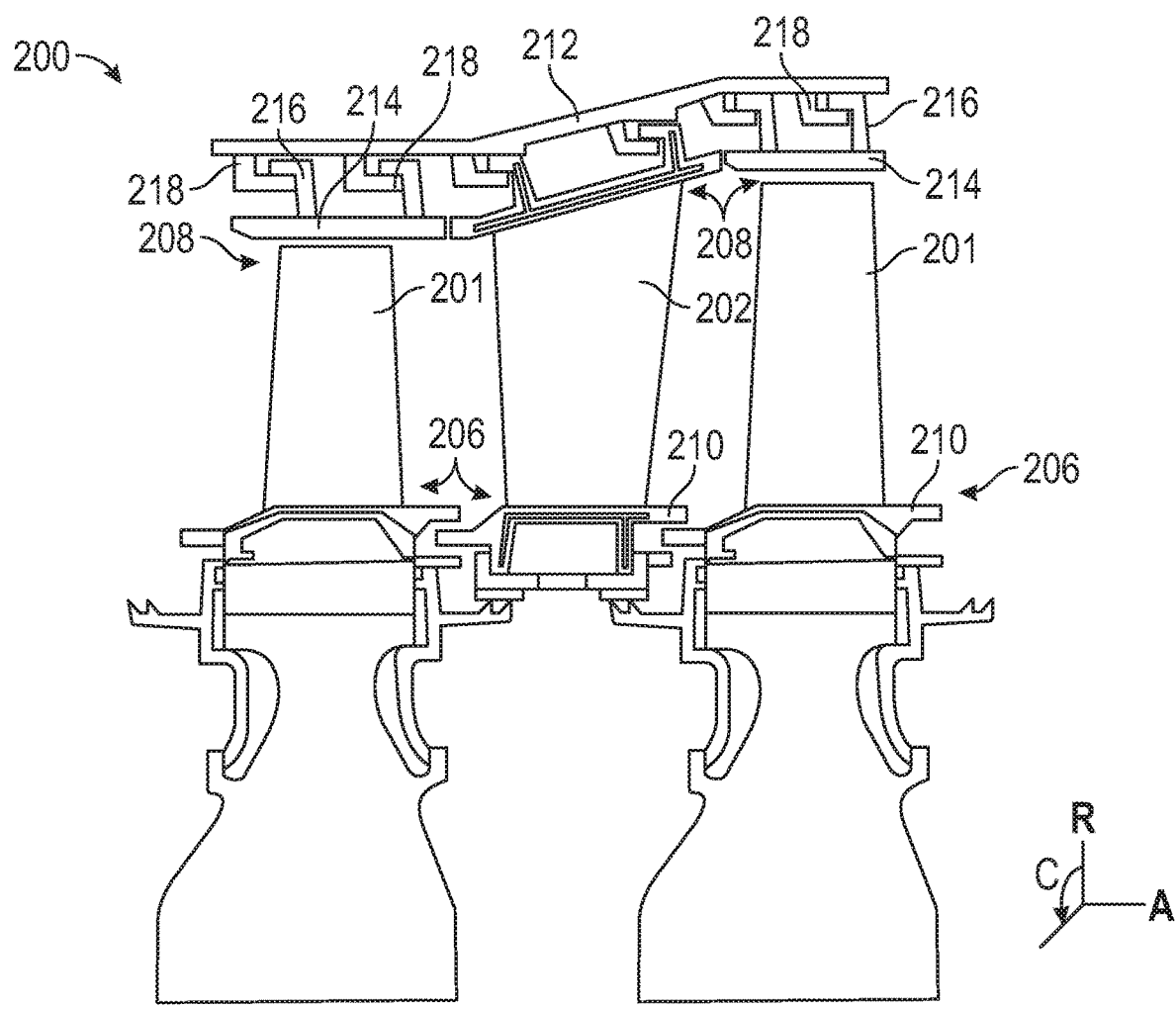
FIG. 2 is a schematic illustration of a portion of a turbine section of a gas turbine engine.

FIG. 2 is a schematic view of a portion of a turbine section that may employ various embodiments disclosed herein. Turbine section 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201. Similarly, other hooks, as illustratively shown, are arranged to support the vane 202 within the case 212.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Blade tips typically may require dedicated cooling circuits due to the high heat load such blade tips experience during operation. Additionally, blade tips may suffer from fatigue or other failure (e.g., crack or rub an outer air seal), and therefore, the outer most cavity is typically dedicated to prevent short circuiting the remainder of the cooling scheme. That is, the radially outer most cooling cavity may be designed to protect the radially inward cavities from being exposed to a hot gas path. Tip flag cavities are one such feature used to provide dedicated cooling to blade tips.

Figure 3A:
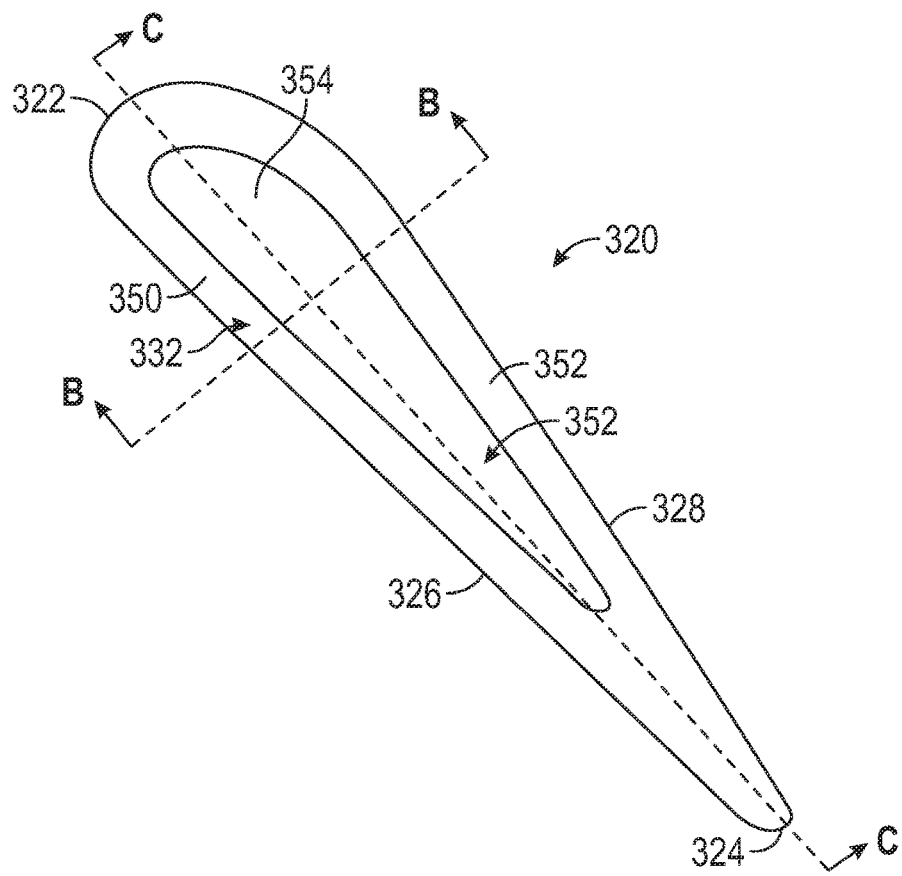
FIG. 3A is a schematic top down, plan view illustration of an airfoil in accordance with an embodiment of the present disclosure.
Figure 3B:
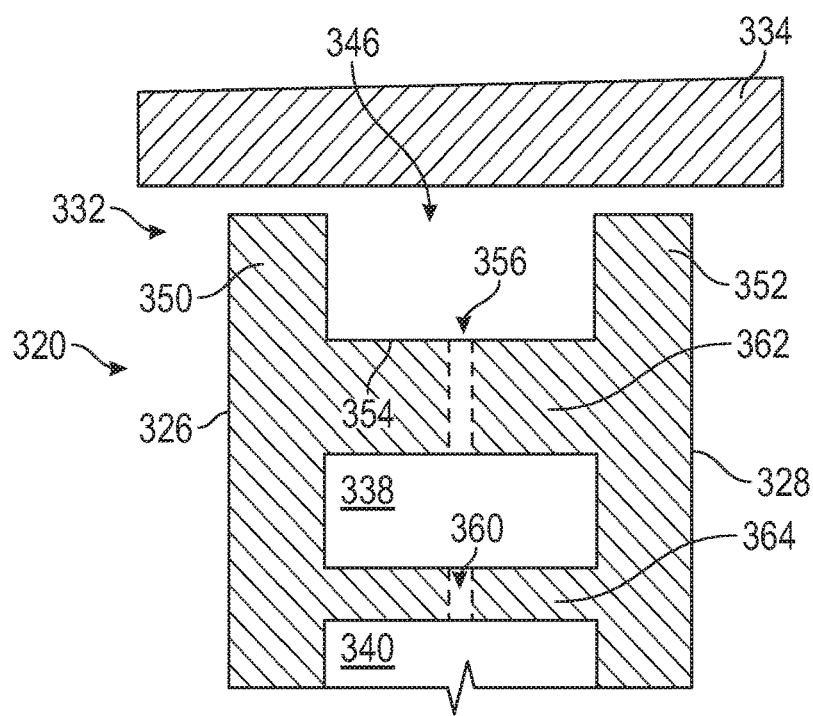
FIG. 3B is a cross-sectional illustration of the airfoil of FIG. 3A as viewed along the line B-B thereof.
Figure 3C:
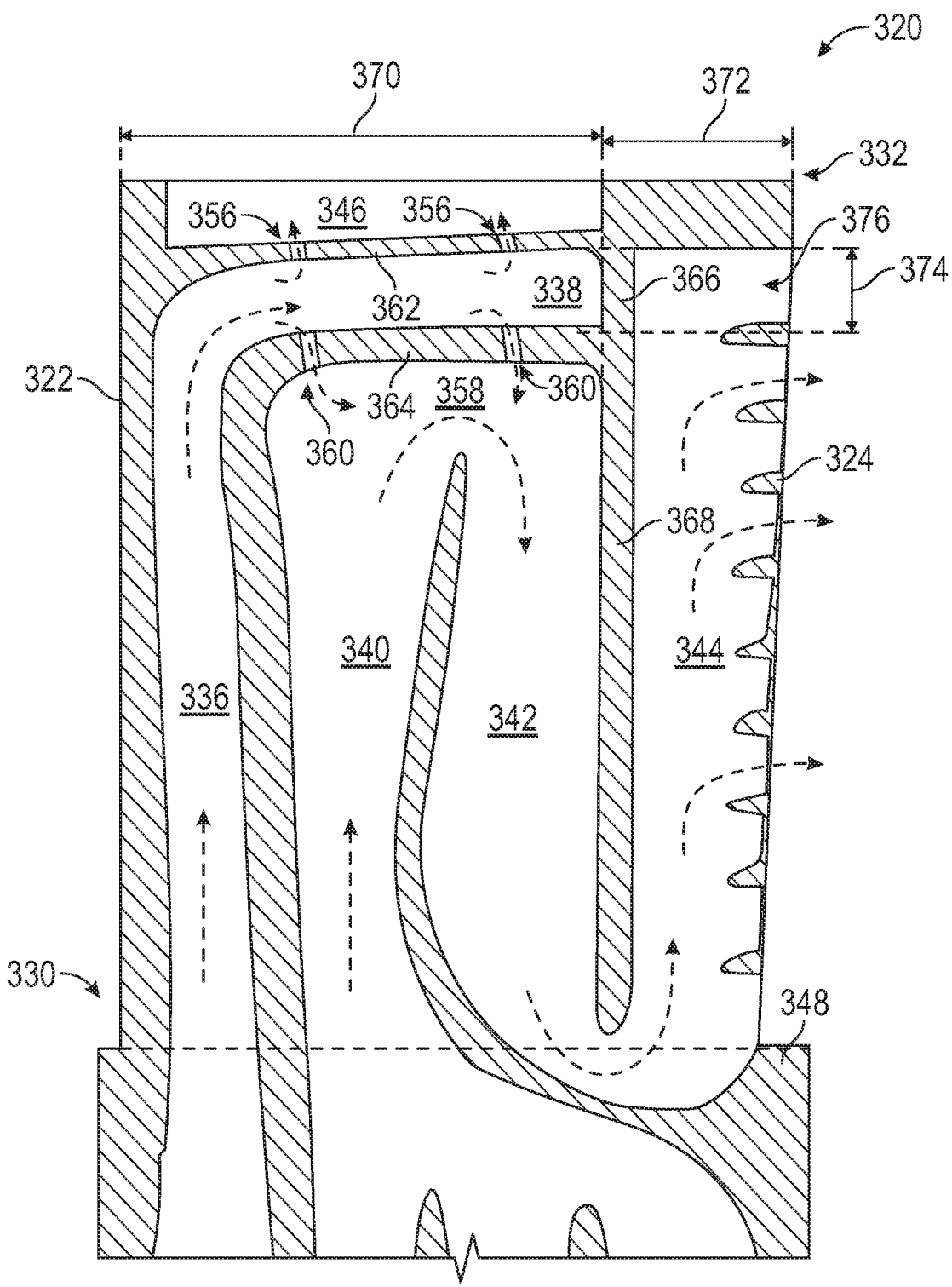
FIG. 3C is a cross-section illustration of the airfoil of FIG. 3A as viewed along the line C-C thereof.

Turning now to FIGS. 3A-3C, an airfoil 320 in accordance with an embodiment of the present disclosure is shown. The airfoil 320, in this embodiment, is a blade for use in a gas turbine engine, as described above. The airfoil 320 extends in an axial direction between a leading edge 322 and a trailing edge 324, as shown in FIGS. 3A, 3C. The airfoil 320 extends in a circumferential direction between a pressure side 326 and a suction side 328, as shown in FIGS. 3A, 3B. The airfoil 320 extends in a radial direction between a root 330 and a tip 332, as shown in FIG. 3C. When installed within a gas turbine engine, the airfoil 320 may be arranged such that the tip 332 is located proximate a BOAS 334 or shroud, as will be appreciated by those of skill in the art (as shown in FIG. 3B).

As shown in FIGS. 3A-3C, the airfoil 320 includes a plurality of cooling cavities. Internal cooling cavities of the airfoil 320 include a leading edge cavity 336, a tip flag cavity 338, an up-pass serpentine cavity 340, a down-pass serpentine cavity 342, and a trailing edge cavity 344 (which may be an end of a serpentine cavity formed or defined by, in part, the up-pass serpentine cavity 340 and the down-pass serpentine cavity 342). In this non-limiting, illustrative embodiment, the airfoil 320 further includes a squealer pocket 346 located at the tip 332 of the airfoil 320. Cooling air can enter the internal cavities from or through a platform 348, as will be appreciated by those of skill in the art.

FIG. 3A is a top view of the airfoil 320, illustrating the tip 332 of the airfoil 320 in plan view. As noted, the tip 332 includes a squealer pocket 346 located in the tip 332. The squealer pocket 346 is formed as a cavity located in tip 332 that maintains a region or pocket of cooling fluid (e.g., air) along the tip 332 of the airfoil 320. The squealer pocket 346 is formed between the sidewalls of the airfoil 320 (e.g., pressure side 326 and suction side 328). In some embodiments, the squealer pocket 346 can include one or more cooling openings that are in fluid communication with a cooling fluid within the internal cooling cavities (e.g., the tip flag cavity 338) in order to provide cooling air into the squealer pocket 346. The squealer pocket 346, as shown in FIGS. 3A-3B, is formed by a pressure sidewall 350 and a suction sidewall 352 that extend upwardly from a pocket surface 354 of the squealer pocket 346. The pressure sidewall 350 and the suction sidewall 352 extend between the leading edge 322 and the trailing edge 324.

As shown in FIGS. 3B-3C, the squealer pocket 346 may be fluidly connected to the tip flag cavity 338 by one or more tip cooling holes 356. As such, cooling air may flow from the tip flag cavity 338 into the squealer pocket 346 to provide cooling air thereto. The cooling air flowing through the tip cooling holes 356 may be sourced from the platform 348, and may, in this illustrative embodiment, flow radially through the airfoil 320 through the leading edge cavity 336 and into the tip flag cavity 338. The tip flag cavity 338 may also (or alternatively) be fluidly connected to the serpentine cavity. As shown, the tip flag cavity 338 is fluidly connected to the serpentine cavity at a serpentine turn 358 between the up-pass serpentine cavity 340 and the down-pass serpentine cavity 342 of the serpentine. The fluid connection between the serpentine cavity and the tip flag cavity 338 may be by one or more bleed holes 360 to enable fluid flow between the tip flag cavity 338 and the serpentine.

The tip flag cavity 338 of the present disclosure is a dead-end cavity. That is, the tip flag cavity 338 does not expel cooling fluid through the trailing edge 324, as typically provided with tip flag cavities, as will be appreciated by those of skill in the art. In accordance with embodiments of the present disclosure, the tip flag cavity 338 is defined between an outer wall 362, an inner wall 364, and a dead-end wall 366. The outer wall 362 is arranged radially outward from the inner wall 364, with the outer wall 362 and the inner wall 364 extending in an axial direction (i.e., in a direction between the leading edge 322 and the trailing edge 324). The dead-end tip flag cavity 338 is arranged between the tip 332 and the serpentine cavity. The dead-end wall 366 extends between the outer wall 362 and the inner wall 364 in the radial direction. In this illustrative embodiment, the tip cooling holes 356 are formed in the outer wall 362 and the bleed holes 360 are formed in the inner wall 364, as illustratively shown.

The dead-end tip flag cavity 338, in accordance with embodiments of the present disclosure, extends above the serpentine turn 358 only and terminates at the same axial location an aft down pass rib 368 of the down-pass serpentine cavity 342. That is, the dead-end wall 366 of the dead-end tip flag cavity 338 is aligned with and/or part of (e.g., an extension of) the aft down pass rib 368 that defines, in part, the down-pass serpentine cavity 342. In this embodiment, the squealer pocket 346 is positioned above the dead-end tip flag cavity 338. Further, as shown, the squealer pocket 346 and the dead-end tip flag cavity 338 terminate at the same axial location. As shown in FIG. 3C, the dead-end tip flag cavity 338, the squealer pocket 346, and the down-pass serpentine cavity 342 extend or end at a first axial distance 370 from the leading edge 322. Stated another way, the dead-end tip flag cavity 338, the squealer pocket 346, and the down-pass serpentine cavity 342 extend or end at a second axial distance 372 from the trailing edge 324. In some embodiments, the dead-end tip flag cavity 338 is approximately the same radial height 374 as an outer most trailing edge slot 376 at the end of the trailing edge cavity 344. That is, the distance between the outer wall 362 and the inner wall 364 of the dead-end tip flag cavity 338 is approximately equal to the spacing defined at the outer most trailing edge slot 376.

Although shown with a specific embodiment, those of skill in the art will appreciate that variations thereon may be enabled without departing from the scope of the present disclosure. For example, in some embodiments, one of the outer wall 362 and the inner wall 364 may be a solid rib that does not provide fluid communication therethrough. Further, in some embodiments, the dead-end wall 366 may include one or more through-holes to allow fluid communication between the dead-end tip flag cavity 338 and the trailing edge cavity 344. Further, in some embodiments, the squealer pocket may be absent entirely, with the dead-end tip flag cavity providing the outermost cavity of the airfoil.

Although shown in FIGS. 3A-3C as an airfoil, those of skill in the art will appreciate that the present disclosure teaches the use of core assemblies for making such airfoils. For example, with reference to FIG. 3C, the illustrative cavities 336, 338, 340, 342, 344, 346 would be inverted as would the cross-hatched structure (i.e., walls, ribs, pedestals, etc.) of the airfoil 320. In such configuration, a serpentine core would be positioned relative to a leading edge core and a tip flag cavity core. The leading edge core and the tip flag cavity core may be a single core body structure, or may be two separate core bodies that are joined, as known in the art. The tip flag cavity core may be arranged and affixed to the serpentine core using one or more stand-offs, which during the manufacturing process will for the bleed holes 360 in the inner wall 364.

In a core assembly, the tip flag cavity core would be arranged to align with an edge or side of a down-pass portion of the serpentine cavity core to form the aft down pass rib 368 and the dead-end wall 366. Further, the squealer pocket 346 may be machined or formed using a core, and an alignment of the dead-end wall 366 with an aft end of the squealer pocket 346, to form the airfoil 320 as shown in FIG. 3C.

Figure 4:
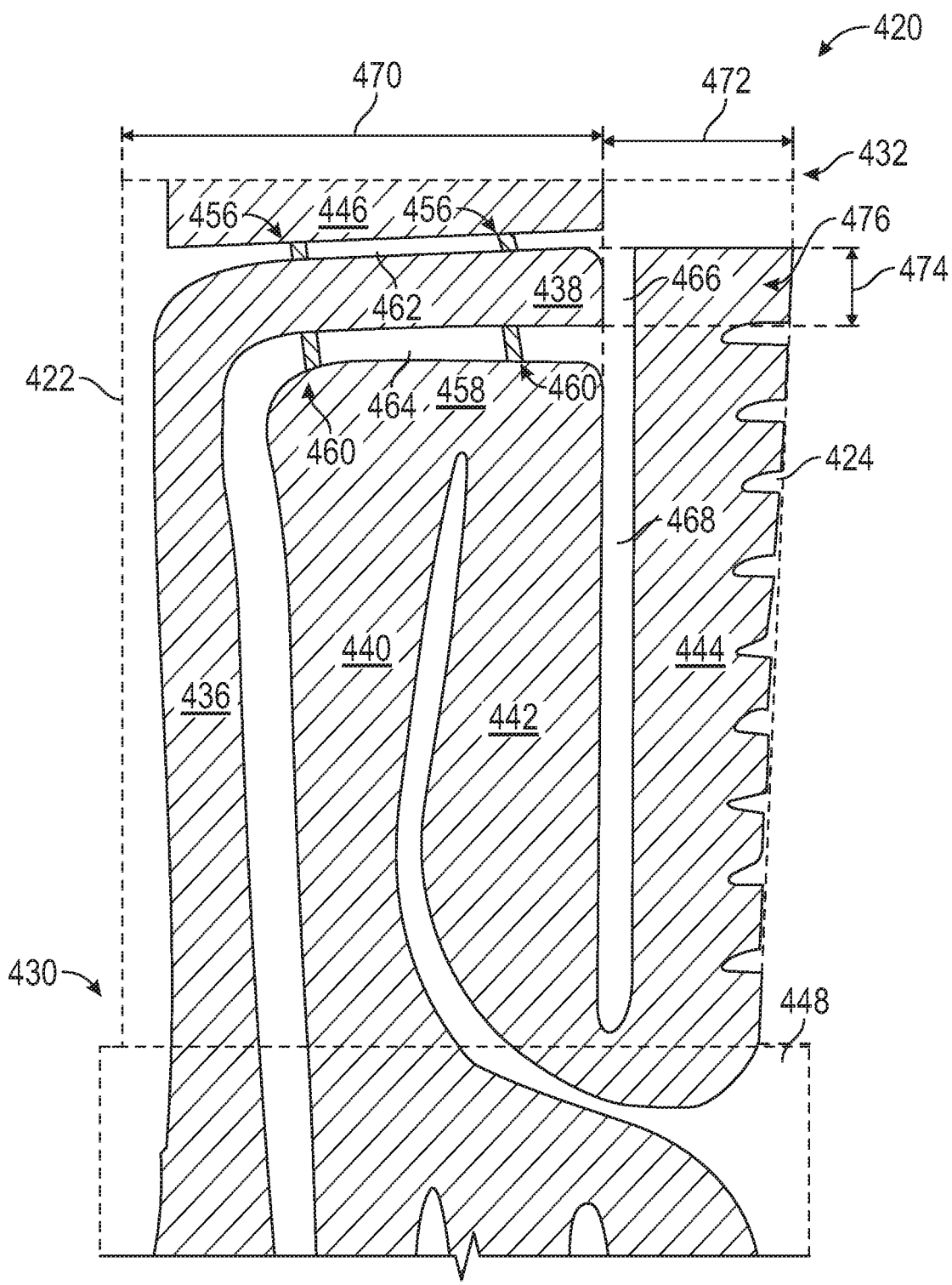
FIG. 4 is a cross-section illustration of a core assembly for making an airfoil in accordance with an embodiment of the present disclosure.

For example, turning to FIG. 4, a core assembly 420 for manufacturing an airfoil in accordance with an embodiment of the present disclosure is shown. The core assembly 420, in this embodiment, is for manufacturing a blade for use in a gas turbine engine (e.g., airfoil 320). The core assembly 420 extends in an axial direction between a leading edge 422 and a trailing edge 424 of a formed airfoil (which can be arranged within a cast or shell, as will be appreciated by those of skill in the art). Similarly, the core assembly 420 is configured to form an airfoil that extends in a circumferential direction between a pressure side and a suction side. Furthermore, the core assembly 420 extends in a radial direction between a root 430 and a tip 432. In FIG. 4, a dashed outline of a formed airfoil is illustratively shown.

As shown in FIG. 4, the core assembly 420 includes a plurality of cores for forming cooling cavities. The cores include a leading edge cavity core 436, a tip flag cavity core 438, an up-pass serpentine cavity core 440, a down-pass serpentine cavity core 442, and a trailing edge cavity core 444. As illustratively shown, the leading edge cavity core 436 and the tip flag cavity core 438 are a unitary core component. Similarly, the up-pass serpentine cavity core 440, the down-pass serpentine cavity core 442, and the trailing edge cavity core 444 are a unitary core component. However, in other embodiments, one or more of the cores may be a separate structure connected or attached to the other core structures. Further, in this non-limiting, illustrative embodiment, the core assembly 420 includes a squealer pocket core 446 located at the tip 432 of the core assembly 420 and the formed airfoil. In some embodiments, the squealer pocket may be formed by machining rather than the use of a core.

As shown in FIG. 4, the squealer pocket core 446 may be connected to the tip flag cavity core 438 by one or more standoffs 456. The standoffs 456 may be configured to form cooling or bleed holes in a formed airfoil, as described above. Further, as shown, the tip flag cavity core 438 is connected to the serpentine cavity core by one or more standoffs 460. As shown, the tip flag cavity core 438 is connected to the serpentine cavity at a serpentine turn 458 between the up-pass serpentine cavity core 440 and the down-pass serpentine cavity core 442. The standoffs 460 can be removed during manufacturing to form bleed holes to enable fluid flow between a formed tip flag cavity and the serpentine cavity, as described above.

The tip flag cavity core 438 is configured to form a dead-end cavity as shown and described above. In accordance with embodiments of the present disclosure, the tip flag cavity core 438 is defined between an outer wall 462, an inner wall 464, and a dead-end wall 466 (and forms similar features in a formed dead-end cavity as described above). The outer wall 462 is arranged radially outward from the inner wall 464, with the outer wall 462 and the inner wall 464 extending in an axial direction (i.e., in a direction between the leading edge 422 and the trailing edge 424). The dead-end tip flag cavity core 438 is arranged between the tip 432 and the serpentine cavity (i.e., the serpentine turn 458). The dead-end wall 466 extends between the outer wall 462 and the inner wall 464 in the radial direction. In this illustrative embodiment, the tip cooling holes described above are formed in the outer wall 462 by the standoffs 456 and the bleed holes described above are formed in the inner wall 464 by standoffs 460, as illustratively shown.

The dead-end tip flag cavity core 438, in accordance with embodiments of the present disclosure, extends above the serpentine turn 458 only and terminates at the same axial location an aft edge of the down-pass serpentine cavity core 442. That is, the dead-end wall 466 of the dead-end tip flag cavity 438 is aligned with and/or part of (e.g., an extension of) a formed aft down pass rib 468 that defines, in part, the down-pass serpentine cavity. In this embodiment, the squealer pocket core 446 in the tip 432 is positioned above the dead-end tip flag cavity core 438. Further, as shown, the squealer pocket core 446 and the dead-end tip flag cavity core 438 terminate at the same axial location. As shown in FIG. 4, the dead-end tip flag cavity core 338, the squealer pocket core 446, and the down-pass serpentine cavity core 442 extend or end at a first axial distance 470 from the leading edge 422. Stated another way, the dead-end tip flag cavity core 438, the squealer pocket core 446, and the down-pass serpentine cavity core 442 extend or end at a second axial distance 472 from the trailing edge 424. In some embodiments, the dead-end tip flag cavity core 438 is approximately the same radial height 474 as an outer most trailing edge slot portion 476 of the trailing edge cavity core 444. That is, the distance between the outer wall 462 and the inner wall 464 of the dead-end tip flag cavity 438 is approximately equal to the spacing defined at the outer most trailing edge slot portion 476. As such, an airfoil in accordance with an embodiment of the present disclosure may be formed using the core assembly 420 shown in FIG. 4.

Advantageously, embodiments described herein provide for a dead-end tip flag cavity arranged within an airfoil. The dead-end tip flag cavity provides for reduced thermal fight in the tip cap material due to the tip flag aligning with the squealer pocket, which can improve thermal mechanical fatigue life locally. Further, the dead-end tip flag cavity can provide for improved cooling within the airfoil (e.g., generation of film cooling within a squealer pocket). Moreover, the dead-end tip flag cavity can provide additional protection to the serpentine cavity. For example, in the outer wall of the dead-end tip flag cavity is breached, thus a breach in the pocket surface of the squealer pocket exists, the serpentine cavity is not breached, and thus cooling of the airfoil may be maintained.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower,"

"above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body extending between a platform and a tip, the airfoil body having a leading edge, a trailing edge, a pressure side, and a suction side;
    a serpentine cavity formed within the airfoil body and having an up-pass serpentine cavity, a down-pass serpentine cavity, and a trailing edge cavity;
    a dead-end tip flag cavity extending in a direction between the leading edge and the trailing edge, the dead-end tip flag cavity arrange between the serpentine cavity and the tip, wherein the dead-end tip flag cavity ends at a dead-end wall located at a position between the leading edge and the trailing edge of the airfoil body, wherein the dead-end tip flag cavity is defined by an outer wall, an inner wall, and the dead-end wall, with the outer wall and the inner wall extending in a direction between the leading edge and the trailing edge and the dead-end wall extending in a direction between the platform and the tip; and
    a squealer pocket arranged at the tip of the airfoil body, wherein the outer wall of the dead-end tip flag cavity forms a pocket surface of the squealer pocket,
    wherein the dead-end tip flag cavity, the down-pass serpentine cavity of the serpentine cavity, and the squealer pocket end at the same axial position in a direction between the leading edge and the trailing edge of the airfoil body.

2. The airfoil of claim 1, further comprising at least one bleed hole arranged to fluidly connect the dead-end tip flag cavity and the serpentine cavity, the at least one bleed hole formed in the inner wall of the dead-end tip flag cavity.

3. The airfoil of claim 1, further comprising at least one tip cooling hole formed within the outer wall and configured to enable fluid connection between the dead-end tip flag cavity and the squealer pocket.

4. The airfoil of claim 1, further comprising a leading edge cavity extending in a direction from the platform to the tip and arranged along the leading edge of the airfoil body.

5. The airfoil of claim 4, wherein the leading edge cavity and the dead-end tip flag cavity are fluidly connected.

6. The airfoil of claim 1, wherein the trailing edge cavity includes an outer most trailing edge slot proximate to the tip and having a radial height, wherein a radial height of the dead-end tip flag cavity is equal to the radial height of the outer most trailing edge slot.

7. The airfoil of claim 1, wherein the down-pass serpentine cavity of the serpentine cavity is defined in part by an aft down pass rib and wherein the dead-end wall of the dead-end cavity are aligned in a direction from the platform to the tip.

8. A gas turbine engine comprising:
    a turbine section having a plurality of airfoils, wherein at least one airfoil comprises a blade having:
    an airfoil body extending between a platform and a tip, the airfoil body having a leading edge, a trailing edge, a pressure side, and a suction side;
    a serpentine cavity formed within the airfoil body and having an up-pass serpentine cavity, a down-pass serpentine cavity, and a trailing edge cavity;
    a dead-end tip flag cavity extending in a direction between the leading edge and the trailing edge, the dead-end tip flag cavity arrange between the serpentine cavity and the tip, wherein the dead-end tip flag cavity ends at a dead-end wall located at a position between the leading edge and the trailing edge of the airfoil body, wherein the dead-end tip flag cavity is defined by an outer wall, an inner wall, and the dead-end wall, with the outer wall and the inner wall extending in a direction between the leading edge and the trailing edge and the dead-end wall extending in a direction between the platform and the tip; and
    a squealer pocket arranged at the tip of the airfoil body, wherein the outer wall of the dead-end tip flag cavity forms a pocket surface of the squealer pocket,
    wherein the dead-end tip flag cavity, the down-pass serpentine cavity of the serpentine cavity, and the squealer pocket end at the same axial position in a direction between the leading edge and the trailing edge of the airfoil body.

9. The gas turbine engine of claim 8, further comprising at least one bleed hole arranged to fluidly connect the dead-end tip flag cavity and the serpentine cavity, the at least one bleed hole formed in the inner wall of the dead-end tip flag cavity.

10. The gas turbine engine of claim 8, further comprising a leading edge cavity extending in a direction from the platform to the tip and arranged along the leading edge of the airfoil body, wherein the leading edge cavity and the dead-end tip flag cavity are fluidly connected.

11. The gas turbine engine of claim 8, wherein the trailing edge cavity includes an outer most trailing edge slot proximate to the tip and having a radial height, wherein a radial height of the dead-end tip flag cavity is equal to the radial height of the outer most trailing edge slot.

12. The gas turbine engine of claim 8, wherein the down-pass serpentine cavity of the serpentine cavity is defined in part by an aft down pass rib and wherein the dead-end wall of the dead-end cavity are aligned in a direction from the platform to the tip.

13. A core assembly for the formation of an airfoil for a gas turbine engine, the core assembly comprising:
    a serpentine cavity core configured to form a serpentine cavity in a formed airfoil, the serpentine cavity core having an up-pass serpentine cavity core, a down-pass serpentine cavity core, and a trailing edge cavity core; and
    a dead-end tip flag cavity core positioned relative to the serpentine cavity core, the dead-end tip flag cavity core extending in a direction between a leading edge and a trailing edge of the formed airfoil, the dead-end tip flag cavity core arrange between the serpentine cavity core and a tip location of the formed airfoil, wherein the dead-end tip flag cavity core ends at a dead-end located at a position between the leading edge and the trailing edge of the formed airfoil, wherein the dead-end tip flag cavity core is configured to form a dead-end tip flag cavity in the formed airfoil, wherein the formed dead-end tip flag cavity is defined by an outer wall, an inner wall, and the dead-end wall, with the outer wall and the inner wall extending in a direction between the leading edge and the trailing edge and the dead-end wall extending in a direction between the platform and the tip; and a squealer pocket core arranged radially outward from the dead-end tip flag cavity core, wherein squealer pocket core is configured to form a squealer pocket and the outer wall of the formed dead-end tip flag cavity forms a pocket surface of the squealer pocket, wherein the dead-end tip flag cavity core, the down-pass serpentine cavity of the serpentine cavity core, and the squealer pocket core end at the same axial position.

14. The core assembly of claim 13, further comprising at least one stand-off connecting the dead-end tip flag cavity core to the serpentine cavity core, wherein the at least one stand-off forms bleed hole in the formed airfoil and arranged to fluidly connect the formed dead-end tip flag cavity and the formed serpentine cavity.

* * * * *